United States Patent [19]

Sachs

[11] Patent Number: 4,674,021
[45] Date of Patent: Jun. 16, 1987

[54] STATIC INVERTER WITH AN OVERCURRENT CIRCUIT UPON A SHORT CIRCUIT

[75] Inventor: Klaus Sachs, Osterode/Harz, Fed. Rep. of Germany

[73] Assignee: Anton Piller GmbH & Co. KG, Osterode/Harz, Fed. Rep. of Germany

[21] Appl. No.: 868,777

[22] Filed: May 29, 1986

[30] Foreign Application Priority Data

May 29, 1985 [DE] Fed. Rep. of Germany ....... 3519151

[51] Int. Cl.⁴ .......................................... H02H 7/122
[52] U.S. Cl. ..................... 363/56; 363/98; 363/132; 361/87; 361/100
[58] Field of Search ............... 363/56, 98, 132; 361/57, 100, 104, 87

[56] References Cited

U.S. PATENT DOCUMENTS 4,476,427 10/1984 Kaneko et al. ............ 363/55 X
4,561,047 12/1985 DePuy ....................... 363/56

FOREIGN PATENT DOCUMENTS 1161639 1/1964 Fed. Rep. of Germany .
2001580 8/1970 Fed. Rep. of Germany .
3127460 2/1983 Fed. Rep. of Germany .
134292 2/1979 German Democratic Rep. .
56-62073 5/1981 Japan .

Primary Examiner—Patrick R. Salce
Assistant Examiner—Anita M. Ault
Attorney, Agent, or Firm—Gottlieb, Rackman & Reisman

[57] ABSTRACT

Static inverter with controlled semiconductor switches and anti-parallel diodes and with a control device for providing a current well above the rated current in the case of a short circuit in a consumer for quickly blowing a fuse in the circuit of the consumer. Anti-parallel thyristors are connected across the inverter output. The control device upon a short circuit takes over the control from the normal inverter control device and switches the semiconductor switches between two currents in the load circuit, of which the higher current represents the peak current limit for the semiconductor switches and the lower current lies considerably above the rated current. The control blocks the semiconductor switches when the current limit is reached and fires at least that thyristor which allows current to pass in the direction of the actual current flow.

4 Claims, 4 Drawing Figures

STATIC INVERTER WITH AN OVERCURRENT CIRCUIT UPON A SHORT CIRCUIT

FIELD OF THE INVENTION

The invention refers to a static inverter with controlled semiconductor switches and anti-parallel diodes and with a device for raising the current for a short term above the rated current in the case of a short circuit.

DESCRIPTION OF THE PRIOR ART

An inverter described in German specification No. DE-OS 31 27 460 has a transformer which is applied to the inverter output through contactors upon voltage failure due to a short circuit, whereby the direct connection to the load is also interrupted. Without raising the output power of the inverter the transformer provides a short circuit current which is many times the rated current and which ensures the fuse in the circuit affected responds quickly. With such a circuit response times in the order of 500 ms are achieved which represent 50 half cycles of a 50 Hz AC current and meet the requirements imposed for the operation of critical lighting, for example for operations.

In computer installations, only power supply interruptions of durations at least one magnitude shorter than those mentioned above are permitted, which durations are far below those achievable with existing inverters. In some high performance applications, the necessary response times may be as low as 10 ms or less.

There is further known a static inverter with a subsequent transformer in which, to limit the current flowing in an electrostatic capacitance, a series circuit with an inductor and two antiparallel thyristors is applied across the inverter output (Japanese specification No. 56-62073 A, Patent Abstracts of Japan—E-69 Aug. 12, 1981, Volume 5, Issue 125).

The object of the invention is to provide an inverter with controlled semiconductor switches and anti-parallel diodes and with a device for raising the current for a short term above the rated current in the case of a short circuit, which can achieve selective response times of approx. 10 ms and less, i.e. during one half cycle at the most.

SUMMARY OF THE INVENTION

This object is achieved according to the invention by a static inverter, wherein across the inverter output anti-parallel thyristors are connected and a control device is provided which takes over normal control of the inverter upon a short circuit and switches the semiconductor switches between two currents in the load circuit, of which the higher current represents the current limit for the semiconductor switches and the lower current lies much above the rate current and which when reaching the current limit blocks the semiconductor switches and fires at least that thyristor which is conductive in the direction of the actual current flow. The inverter can be in single-phase bridge configuration, but the invention is also applicable to inverters in multi-phase, e.g. three-phase configurations.

With the inverter according to the invention the output current is raised far beyond the rated current in the case of a short circuit. With the components for the rated circuit, short circuit currents many times higher than rated current can be achieved and thus an extremely quick selective triggering of fuses.

BRIEF DESCRIPTION OF THE DRAWINGS

The invention is shown in the drawing as an embodiment and is described with further features of the invention with reference to the drawing. In the drawing.

DESCRIPTION OF THE PREFERRED EMBODIMENTS

Figure 1:
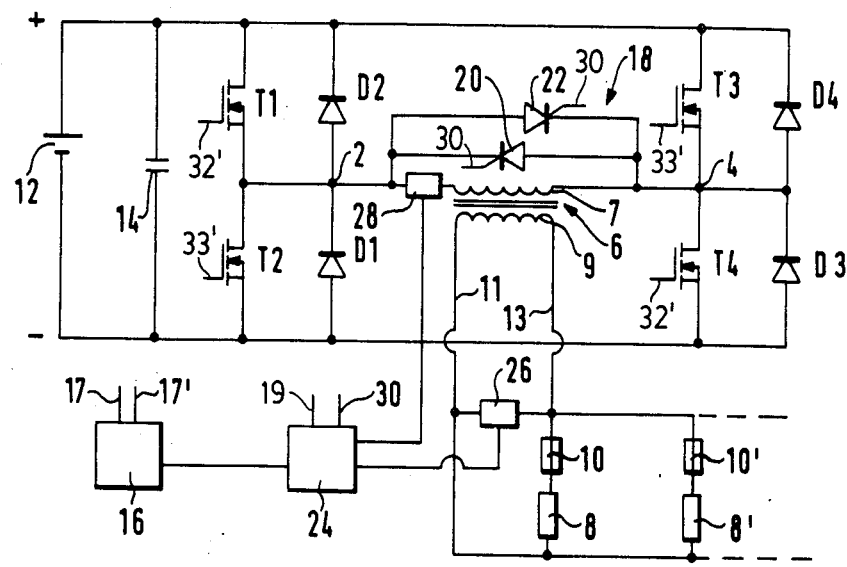
FIG. 1 shows a circuit of a static inverter with a load circuit.

FIG. 1 shows a circuit with MOS-Fet's used as semiconductor switches. Two pairs of semiconductor switches T1, T2 and T3, T4 are provided, with the two switches of each pair being connected in series with each other. Freewheeling diodes D1 to D4 are connected antiparallel to each of the semiconductor switches. The combinations T1, D2 and T2, D1 have a common load point 2 and the combinations T3, D4 and T4, D3 have a common load point 4. These two load points 2 and 4 form the inverter output. A transformer 6 is connected to these load points, which is loaded by at least one external ohmic-inductive consumer 8, 8'. Together with the external consumers 8, 8' this transformer forms the load for the inverter. The primary winding 7 of the transformer is connected to the inverter output and the external consumers 8, 8' are connected to its secondary winding 9 through a fuse 10, 10' each. The consumers 8, 8' can also be connected directly to the inverter without a transformer if one is not required.

The other connections of the semiconductor switches T1 and T3 and the freewheeling diodes D2 and D4 are each connected to the positive terminal of a DC source 12 whilst the other connections of the semiconductor switches T2 and T4 and the freewheeling diodes D1 and D3 are connected to the negative terminal of the DC source 12. A smoothing capacitor 14 is also connected across the DC source 12.

A control device 16 with outputs 17, 17' is provided for the semiconductor switches T1 to T4 and is shown here as a block. Such control devices for sinusoidal modulation of the pulsed input voltage and its connections to the semiconductor switches are known in the art.

Between the load points 2, 4 a controlled freewheeling circuit 18 with two anti-parallel thyristors 20, 22 is connected. A further control device 24 for the thyristors 20 and 22 is provided which is effective depending upon the voltage on the secondary side of the transformer, and in particular alternatingly with the device 16 as will be described below.

The voltage between the secondary leads 11, 13 of the transformer is measured by means of a voltage monitor 26 on the secondary side of the transformer. The load current is determined by means of a current monitor 28 on the inverter output which is connected in series with the primary winding 7 of the transformer 6. The control of the thyristors 20, 22 by the control device 24 is represented by the control lead 30. The device 24 also controls the semiconductor switches T1–T4 through the lead 19, as an alternative to the control device 16 and in dependence on the current flow at the inverter output, as illustrated in more detail in FIG. 2. The semiconductor switches are blocked by this control device 24 if the current limit for the semiconductor switches is reached and are switched on again when the current has fallen to a given minimum value which, like the maximum current given by the current limit, is much higher than the rated current.

The current limit is the current up to which in particular the bond wires of the semiconductor switches can be loaded for short periods and is a multiple of the rated current. The circuit can also be designed to operate depending on the $I^2t$ value. This value corresponds to the amount of heat taken over dynamically by the chips in the semiconductor switches. The critical value coincides with the heat capacity of the chip volume typical for the semiconductor switches from which the time for reaching the maximum permissible temperature is depending.

Figure 2:
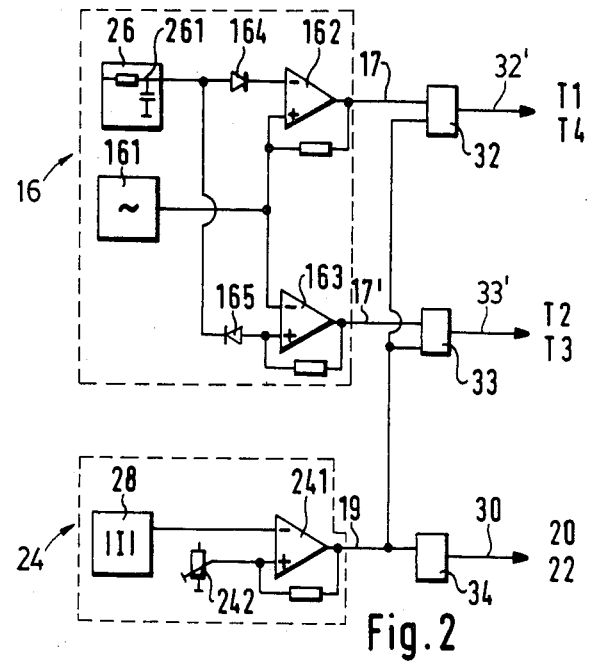
FIG. 2 shows an embodiment of the circuitry of the device.

Details of the circuitry of the two control devices 16 and 24 and their interaction are shown in FIG. 2.

The control device 16 for normal operation has a generator 161 producing a sinusoidal AC voltage. In the comparators 162 and 163, which have a slight hysteresis, this voltage is compared with the filtered output voltage formed with filters 261 in the voltage monitor 26. The comparator 162 sends the control signals for the switches T1 and T4 through the control lead 17 to affect the positive half cycle of the output voltage. In the same way the control signals for the switches T2 and T3 for the negative half cycle are generated in the comparator 163 and applied to T2 and T3 through the control heads 17'. Diodes 164 and 165 are provided to effectively block the transistors not switched in. The switching frequency in this device is self-adjusting depending upon the load and can be influenced by the time constant of the filter 261 in the voltage monitor 26 as well as by the hysteresis of the comparators 162 and 163. The signals on the leads 17 and 17' are each applied to a first input of an AND gate 32 or 33 associated with the transistor pairs T1, T4 or T2, T3 via leads 32' or 33'.

Upon a short circuit between the connection leads 11, 13 at the output of the inverter the output voltage collapses, as does the signal produced by the voltage monitor 26 at the inputs of the comparators 162 and 163. The switches T1, T4 or T2, T3, respectively, for the actual half cycles are therefore activated via the control leads 17 and 17' respectively.

The control device 24 for the short circuit also has a comparator 241 with a slight hysteresis which compares the output current measured with the current monitor 28 across the load points to a fixed value determined by the resistor 242 corresponding to the maximum permissible current. The polarities are such that the maximum voltage is present at the output of the comparator 241 during operation below the current limit.

Through the lead 19 this voltage is applied to the second inputs of the two AND gates 32, 33. Thus, upon a short circuit the switches T1, T4 or T2, T3 to be rendered conductive are selected via the control device 16 and the control is taken over by the control device 24, blocking the switches after the maximum permissible current has been reached and releasing the switches after the current has fallen to a given lower value.

The control signals for the thyristors 20 and 22 are produced by inverting the signal on the lead 19 in an inverting circuit 34.

The above device is just one possible embodiment for controlling the semiconductor switches according to the invention.

The control signals can also be generated by modulating a sinusoidal voltage of a nominal frequency with a triangular voltage of a carrier frequency which should be of several kHz.

The configuration described operates as follows:

If an undervoltage across the secondary side of the transformer is detected by the voltage monitor 26 which is due to a short circuit in a consumer, the normal voltage regulation by pulse width modulation using the control device 16 is replaced by a pulse width modulation by current limiting using the device 24. The semiconductor switches remain switched on by the device 24 until they reach their current limit and when the limit is reached the semiconductor switches are blocked by the device 24. The reaching of the current limit in the load circuit is determined by the current monitor 28.

When the semiconductor switches are blocked the device 24 fires the two anti-parallel thyristors 20 and 22 simultaneously through the lead 30. The current resulting from the short circuit is driven by the magnetic energy stored in the inductance of the short circuit path into the thyristor conductive in the direction of this current. The current flow through the shorted load is therefore retained.

In contrast to normal operation with the control device 16, in which the current applied by the energy stored in the load commutates into the freewheeling diodes D1 to D4 and is fed back to the voltage source whereby it rapidly disappears as a result of the counter voltage, a slow fade-out of the current according to the time constant L/R in the short circuit is achieved by switching on the thyristor which conducts current in the direction of the current flow and which has the function of a controlled freewheeling diode. This time constant is large, as the resistors in the load circuit are of low value to avoid unnecessary operating losses.

When reaching the present minimum current which, as stated, is still far above the rated current, the previously blocked semiconductor switches are switched on, for example T2 and T3 of thyristor 22 was previously in operation. In this way the thyristors and the control device 24 ensure that the effective value of the load current in the case of a short circuit is raised to a multiple in comparison to the rated current, thus considerably relieving the semiconductor switches and the freewheeling diodes of the short circuit current.

The switching process described is repeated and therefore the short circuit current is held at its high value until the fuse 10. 10' in the secondary circuit is blown. The voltage across the load then rises again to the normal value indicating that the short circuit has been removed. Then the normal pulse width modulation control of the semiconductor switches by the control device 16 is resumed.

The thyristors 20 and 22 are only loaded in the case of a short circuit and can therefore be of correspondingly small capacity.

The commutation of the inductively driven current in the short circuit through the thyristor can occur several times during a half cycle of 10 ms for example. Thus the maximum current corresponding to the current limit for the semiconductor switches is reached several times during one half cycle and at the same time a current considerably above the rated current is maintained through the load, thus guaranteeing that in the case of a short circuit a fuse will be blown normally during the first half cycle during which the short circuit occurs, thus switching off the consumer in which the short circuit exists.

Figure 3:
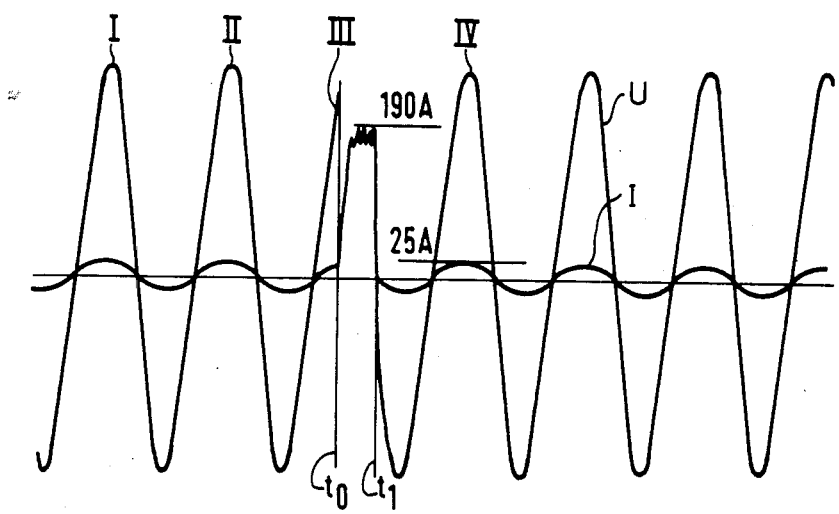
FIGS. 3 and 4 are diagrams showing the effect of the circuit.
Figure 4:
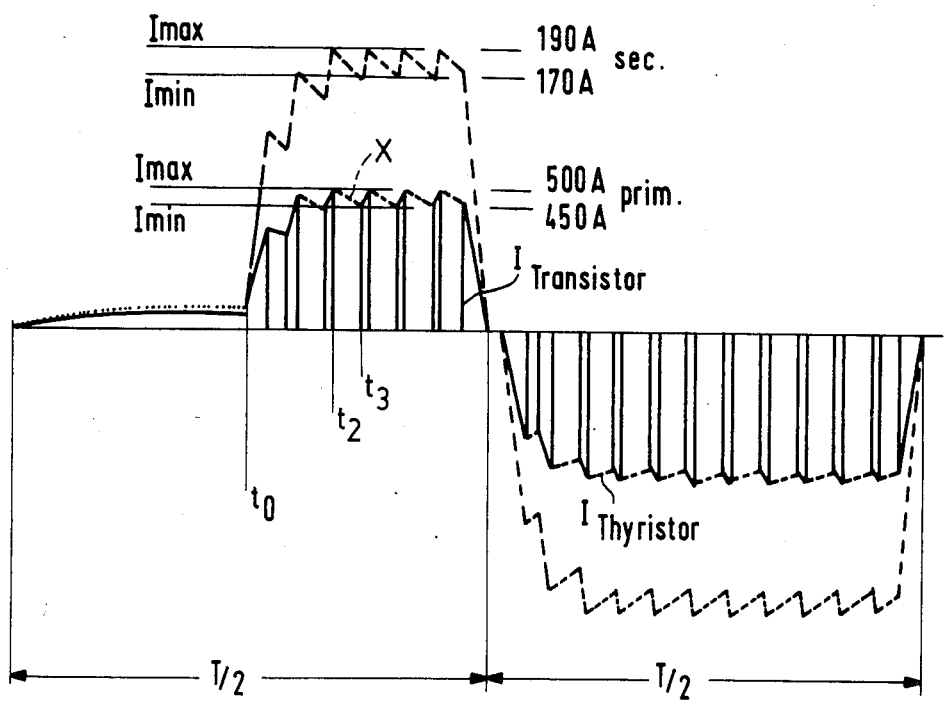

The operation of the inverter described is now illustrated according to the oscilloscope diagrams in FIGS. 3 and 4. FIG. 3 shows the AC voltage U generated by the inverter and the relevant rated current I in normal operation during several half cycles. During the third positive half cycle III a short circuit occurred at the time $t_0$. This results in voltage failure and a changeover of the control from the device 16 to the device 24. This raises the effective value of the load current I by a multiple in comparison to rated current in normal operation. A load current is in this case held at e.g. between 170 and 190 A on the secondary side in comparison to 25 A in normal operation. At the time $t_1$, i.e. shortly after the end of the positive half cycle III, the fuse is blown and the short circuited consumer switched off. The semiconductor switches are then again controlled by the device 16 and the voltage U returns to its normal value during the following negative half cycle.

Further details are shown in FIG. 4, illustrating the current circulating in the semiconductor switches upon occurrence of a short circuit.

At the time $t_0$ of a positive half cycle with the duration T/2 a voltage failure due to a short circuit occurred. By switching the control of the semiconductors from the normal control device 16 for pulse width modulation to the control device 24 the current flow through the semiconductor switches is permitted to reach the maximum allowable current in a number of steps. On the primary side the current shown in full lines rises far above the rated current of 25 A. Upon the third OFF operation of the semiconductor switches at the time of blocking the conducting semiconductor switches, i.e. at $t_2$, the current on the primary side has reached its maximum value $I_{max}$. After firing the thyristors the current in the short circuit decreases slowly along the broken line X shown on the graph according to the time constant L/R until it reaches the minimum current $I_{min}$. $I_{min}$ is reached at the time $t_3$ and the semiconductor switches and therefore the loading circuit are switched on again. The short circuit current then rises to $I_{max}$ again. The current which in this case for example is held at between $I_{max}=500$ A and $I_{min}=450$ A on the primary side corresponds to a current between $I_{max}=190$ A and $I_{min}=170$ A on the secondary side, as shown in FIG. 4. The effective short circuit current is therefore many times higher than the rated current on the secondary side. This extraordinarily high short circuit current will normally blow a fuse or trigger a circuit breaker within 10 ms, i.e. during one half cycle of an AC voltage with a frequency of 50 Hz.

If at the end of this positive half cycle the consumer with the short circuit has not yet been switched off, the control by the control device 24 is continued at least for the following negative half cycle.

If it is not possible to switch off the short circuit within a reasonable period of time, the current can be reduced after 4 to 6 periods for example, to about 1.5 times the rated current in order to protect the components. Suitable timers can be incorporated for this in the control device 24.

Above an embodiment of an inverter in a single-phase bridge configuration has been described. In a similar way embodiments of inverters with multi-phase, especially three-phase output are possible providing the high current for blowing a fuse in the manner described above and shown in the drawing.

What I claim as my invention and desire to secure by Letters Patent of the United States is:

1. A static inverter for providing an alternating output voltage from a DC input voltage, the inverter having at least four semiconductor switches arranged in pairs of two switches each, with the switches of each pair being connected in series with each other, one terminal of each switch in each pair being connected to a respective terminal of a DC power source and the other terminals of each two paired switches being connected to a respective common point, a respective freewheeling diode connected anti-parallel to each switch, a load circuit between each two common points forming a respective output of the inverter, and a first control device arranged for delivering control signals to said switches for controlling the output voltage of the inverter between each two associated common points;

wherein the improvement comprises:
(a) a respective pair of anti-parallel thyristors connected across each associated pair of common points; and
(b) a second control device for delivering control signals to said switches and said thyristors in response to the magnitude of the current flow in each load circuit;
(c) said control devices being arranged such that, upon occurrence of a short circuit in a load circuit, (i) said second control device takes over control of said switches from said first control device and operates the respective switches between two current limits, one of which is higher and represents the maximum allowable current for said switches, and the other of which is lower but is still much higher than the rated output current, and (ii) said second control device, when taking over the control upon the higher current limit being reached, operates to block said switches and to fire that one of the associated thyristors which is conductive in the direction of the actual current flow in the respective load circuit, and upon the lower current limit being reached, operates to release said switches.

2. An inverter according to claim 1, wherein said semiconductor switches are MOS-Fet's.

3. An inverter according to claim 1, which is of single-phase configuration in a full bridge circuit.

4. An inverter according to claim 1, which is of three-phase configuration provided with a three-phase output.

* * * * *